(12) United States Patent
Russell et al.

(10) Patent No.: US 9,367,437 B2
(45) Date of Patent: Jun. 14, 2016

(54) METHOD AND APPARATUS FOR REDUCING THE NUMBER OF SPECULATIVE ACCESSES TO A MEMORY ARRAY

(71) Applicants: Andrew C. Russell, Austin, TX (US); Ravindraraj Ramaraju, Round Rock, TX (US)

(72) Inventors: Andrew C. Russell, Austin, TX (US); Ravindraraj Ramaraju, Round Rock, TX (US)

(73) Assignee: FREESCALE SEMICONDUCTOR, INC., Austin, TX (US)

( * ) Notice: Subject to any disclaimer, the term of this patent is extended or adjusted under 35 U.S.C. 154(b) by 317 days.

(21) Appl. No.: 13/831,870

(22) Filed: Mar. 15, 2013

(65) Prior Publication Data
US 2014/0281291 A1    Sep. 18, 2014

(51) Int. Cl.
| G06F 12/00 | (2006.01) |
| G06F 12/02 | (2006.01) |
| G06F 9/34  | (2006.01) |
| G06F 12/06 | (2006.01) |

(52) U.S. Cl.
CPC ........ *G06F 12/00* (2013.01); *G06F 9/34* (2013.01); *G06F 12/0207* (2013.01); *G06F 12/0215* (2013.01); *G06F 12/06* (2013.01); *G06F 2212/1028* (2013.01); *Y02B 60/1225* (2013.01)

(58) Field of Classification Search
None
See application file for complete search history.

(56) References Cited

U.S. PATENT DOCUMENTS

| 5,754,819 | A  | 5/1998  | Lynch et al. |
| 5,777,628 | A  | 7/1998  | Buck-Gengler |
| 6,088,763 | A  | 7/2000  | Silberman et al. |
| 6,425,044 | B1 | 7/2002  | Jeddeloh |
| 6,631,393 | B1 * | 10/2003 | Dai ............................ 708/710 |
| 6,681,313 | B1 | 1/2004  | Trong et al. |
| 6,707,752 | B2 | 3/2004  | Zhang |
| 6,711,654 | B2 | 3/2004  | Rangan |
| 6,738,890 | B2 | 5/2004  | Ishikawa et al. |
| 6,944,088 | B2 | 9/2005  | Asano et al. |
| 6,957,315 | B2 | 10/2005 | Chauvel |
| 7,089,360 | B1 | 8/2006  | Zhang |
| 7,286,423 | B2 | 10/2007 | Ramaraju |
| 7,363,436 | B1 | 4/2008  | Yeh et al. |
| 7,669,034 | B2 | 2/2010  | Bearden et al. |
| 7,836,435 | B2 | 11/2010 | Zhang et al. |
| 2006/0064455 | A1 * | 3/2006 | Schulte ........................ 708/708 |
| 2007/0028051 | A1 | 2/2007  | Williamson et al. |

(Continued)

OTHER PUBLICATIONS

Austin et al., Streamlining Data Cache Access w/ Fast Address Calculation, 22nd International Symposium on Computer Architecture, 1995.
Heald, R. et al, 64 kB Sum-Addressed-Memory Cache with 1.6 ns cycle and 2.6 ns latency, IEEE JSSC, vol. 33, Issue 11, 1998, pp. 1682-1689.

(Continued)

*Primary Examiner* — Kevin Verbrugge
*Assistant Examiner* — Tahilba Puche

(57) ABSTRACT

A method includes: receiving a first plurality of consecutive bits from a base operand, wherein a MSB of the first plurality of consecutive bits from the base operand is a LSB of a second plurality of consecutive bits from the base operand; and receiving a first plurality of consecutive bits from an offset operand, wherein a MSB of the first plurality of consecutive bits from the offset operand is a LSB of a second plurality of consecutive bits from the offset operand. The method includes summing the first plurality of consecutive bits from the base operand with the first plurality of consecutive bits from the offset operand to generate a sum value; and allowing access to one of a plurality of memory arrays and disabling access to the remainder of the plurality of memory arrays when a lesser significant bit to a MSB of the sum value equals zero.

19 Claims, 2 Drawing Sheets

(56) References Cited

U.S. PATENT DOCUMENTS

| | | |
|---|---|---|
| 2007/0033318 A1 | 2/2007 | Gilday et al. |
| 2007/0094480 A1* | 4/2007 | Ramaraju et al. ............. 711/220 |
| 2008/0222361 A1* | 9/2008 | Ramaraju et al. ............. 711/128 |
| 2010/0306302 A1* | 12/2010 | Ramaraju et al. ............. 708/670 |

OTHER PUBLICATIONS

J. Cortadella et al., "Evaluation of A+B=K Conditions Without Carry Propagation", IEEE Trans. on Computers, Nov. 1992, vol. 41, No. 11.

W. Lynch et al., "Low Load Latency through Sum-Addressed Memory (SAM)".

* cited by examiner

METHOD AND APPARATUS FOR REDUCING THE NUMBER OF SPECULATIVE ACCESSES TO A MEMORY ARRAY

FIELD

The present disclosure relates generally to memory arrays and more particularly to a method and apparatus for reducing the number of speculative accesses to a memory array.

BACKGROUND

A central processing unit (CPU) within a computer system typically accesses one or more memory arrays when executing programmed instructions of a CPU process. In some prior art arrangements, base and offset operand addition is used to address content within caches as well as data or instructions within other CPU memory units or memory arrays. In one particular arrangement, a 64-bit base operand and a 64-bit offset operand for a given programmed instruction are summed or added together to arrive at an effective address used to access a memory array. Such CPU arrangements can take at least two cycles to access the memory array, a first cycle to add the base and offset operands and a second cycle to access the memory array based on the results of the addition.

To decrease memory access latency, content from a main memory unit can be stored in smaller-sized caches that are indexed by summing portions of the base and offset operands called index bits. A decode of the sum of the index bits points to a particular wordline or row of memory array cells that is "turned on" to access the content of the cell. This is referred to as a memory array access. The addition of the smaller operands as well as the use of the smaller-sized memory arrays results in more efficient memory access.

Further optimizations have been made by using speculative access methods, whereby multiple speculative accesses to a memory array are made without knowing a least significant bit (LSB) carry-in to the sum of the index bits. Once the LSB is known, content from one of the speculative accesses is selected. Thus, a shortcoming of speculative access methods, as compared to methods that take longer but require only a single memory access to obtain the memory content, is the additional dynamic power consumption used to turn on multiple wordlines.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
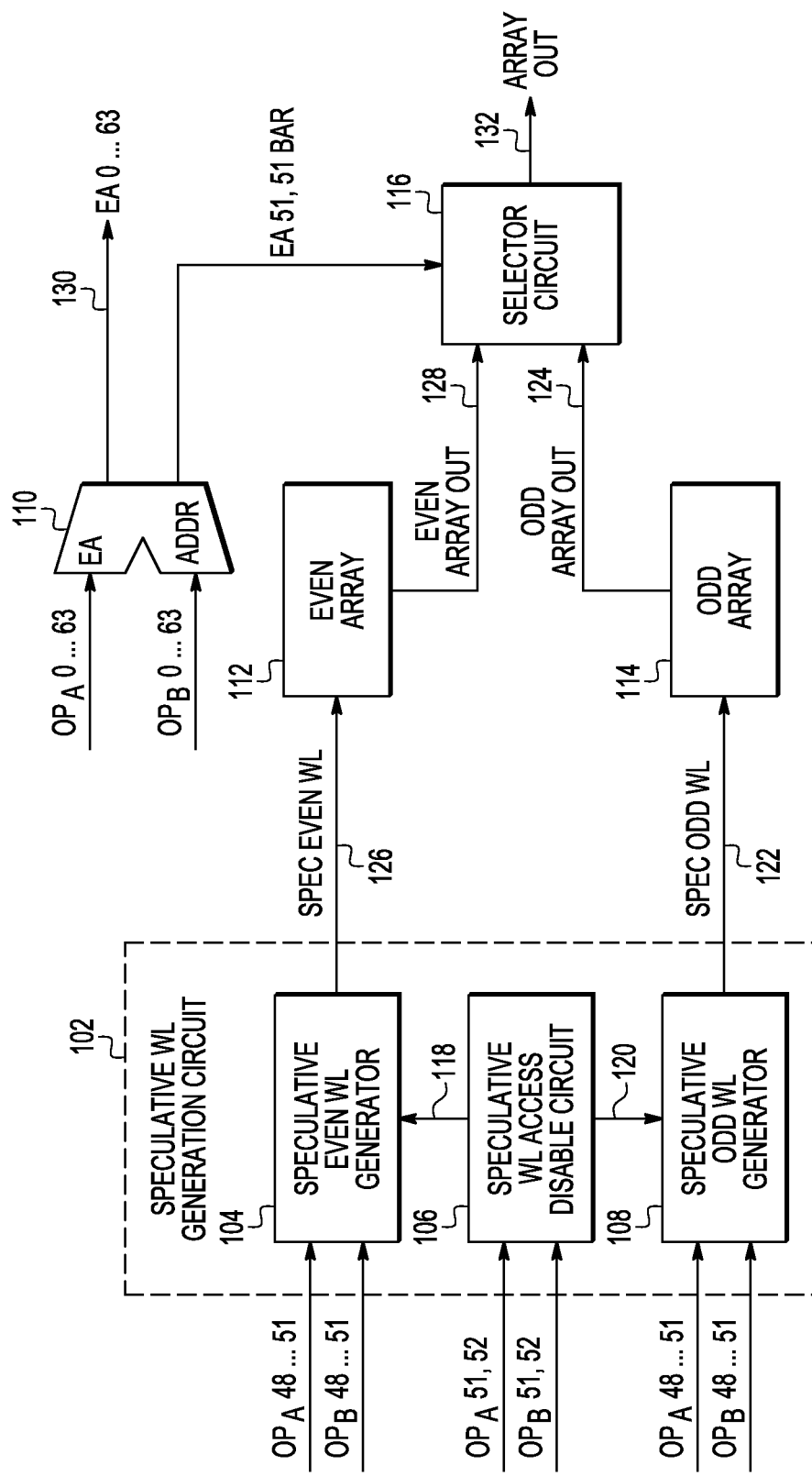
FIG. 1 is a block diagram illustrating portions of a computer system in accordance with an embodiment.

The present disclosure is illustrated by way of example and is not limited by the accompanying figures, in which like reference numbers indicate similar elements. Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present disclosure.

The apparatus and method components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein. Also, the functions included in the flow diagrams do not imply a required order of performing the functionality contained therein.

DETAILED DESCRIPTION

In accordance with the teachings herein is a method and apparatus that reduces the number of speculative accesses to a memory array such as an L1 or level 1 cache resident on-chip with a CPU. The reduction in speculative accesses leads to a reduction in dynamic power consumption in devices implementing the present teachings. The amount of power savings depends on the number of bits used to generate a signal to disable some of the speculative memory array accesses.

In accordance with one embodiment is a method for accessing a memory array. The method includes: receiving a first plurality of consecutive bits from a base operand, wherein a most significant bit of the first plurality of consecutive bits from the base operand is a least significant bit of a second plurality of consecutive bits from the base operand; and receiving a first plurality of consecutive bits from an offset operand, wherein a most significant bit of the first plurality of consecutive bits from the offset operand is a least significant bit of a second plurality of consecutive bits from the offset operand. The method further includes: summing the first plurality of consecutive bits from the base operand with the first plurality of consecutive bits from the offset operand to generate a sum value; and allowing access to one of a plurality of memory arrays and disabling access to the remainder of the plurality of memory arrays when a lesser significant bit to a most significant bit of the sum value equals to zero.

In accordance with yet another embodiment, two memory arrays, e.g., an odd wordline memory array and an even wordline memory array, are provided. In accordance with this embodiment, a method includes summing a first set of bits with a second set of bits to generate a sum value. The first set of bits includes at least two consecutive bits from a base operand, wherein a most significant bit of the first set of bits is a least significant bit of a base index address from the base operand. The second set of bits includes at least two consecutive bits from an offset operand, wherein a most significant bit of the second set of bits is a least significant bit of an offset index address from the offset operand. The method further includes disabling access to one and allowing access to one of two memory arrays when a lesser significant bit to a most significant bit of the sum value equals to zero.

In one example implementation, disabling access to one and allowing access to one of the two memory arrays includes: disabling access to the odd wordline memory array and allowing access to the even wordline memory array when the most significant bit of the sum value equals to zero; and disabling access to the even wordline memory array and allowing access to the odd wordline memory array when the most significant bit of the sum value equals to one. In addition, the method further includes allowing access to both the odd and the even wordline memory arrays when each lesser significant bit to the most significant bit of the sum value equals to one. In one further example implementation, the base and offset operands each include 64 bits; the base index address and the offset index address each contain a same number of bits, which is equal to three bits or four bits; and the first and second sets of bits from the base and offset operands contain a same number of bits, which is equal to or less than four bits.

FIG. 1 is a block diagram illustrating portions of a computer system in accordance with an embodiment with the present disclosure, and indicated as 100. In one particular arrangement, system 100 includes components of a CPU contained within a computer system, wherein a computer system is a device that includes at a minimum a processing device and memory suitable to carry out functionality in accordance with the present teachings. As shown, system 100 include: a speculative wordline (WL) generation circuit 102; an effective address adder ("EA ADDER") 110; a memory array, which in this embodiment is organized as an even array 112 and an odd array 114; and a selector circuit 116. In an embodiment, the even array 112 and the add array 114 be implemented as an L1 or level 1 cache that is on-chip with the CPU. However, arrays 112 and 114 can represent any type of memory on- or off-chip from the CPU. Moreover, in a particular CPU arrangement, a processor core (not shown) provides the operands and partial operands to a processor within the CPU, which includes, but is not limited to, the speculative WL generation circuit 102 and the EA ADDER 110.

The EA ADDER 110 is implemented as a digital circuit that performs base address or operand ($OP_A$) and offset address or operand ($OP_B$) addition to calculate an effective address (EA) 130. The effective address output by the EA ADDER 110, or portions and translations thereof, can be used by various components of the computer system such as the cache 112 and 114, and other components not shown such as a main memory unit that is external to the CPU and that stores the same content as is stored in the cache, a translation lookaside buffer (TLB), etc. In an embodiment, the main memory unit is a Dynamic Random Access Memory (DRAM) that resides off-chip from the CPU. At least some of the content, e.g., frequently accessed data and/or instructions, of the main memory unit is stored in the cache 112, 114. In one embodiment, the cache is a Static Random Access Memory (SRAM) that resides on-chip with the CPU. In a further embodiment, the main memory unit resides on-chip with the CPU, and the cache is a portion of the main memory unit.

As illustrated, the cache is organized into two banks of memory cells, e.g., the even array 112 and the odd array 114, which are independently accessed using separate sum and decode operations. The even array 112, also referred to herein interchangeably as a second memory array, an even wordline array, an even wordline memory bank, and an even memory array, includes only even-numbered wordlines, e.g., 0, 2, 4, etc., or entries that are addressed using even numbered wordlines. The odd array 114, also referred to herein interchangeably as a first memory array, an odd wordline array, an odd wordline memory bank, and an odd memory array, includes only odd-numbered wordlines, e.g., 1, 3, 5, etc., or entries that are addressed using odd numbered wordlines. As used herein, a wordline (WL) is an address of an entry in a memory array or an actual memory array entry, e.g., including a row of memory cells, as the context indicates.

In one example implementation, the cache 112, 114 includes sixteen entries, with eight even-numbered wordlines in the even array 112 and eight odd-numbered wordlines in the odd array 114. However, the cache 112, 114 can include any number of entries that, for instance, enable the cache to maintain a lower latency than the latency associated with accessing the main memory unit that is external to the CPU. Although in this example implementation the cache is divided into two memory arrays, the even 112 and the odd 114 memory array, in an alternative arrangement the cache could be divided into any number of memory arrays each independently accessed.

The speculative wordline generation circuit 102 includes circuitry that is configured to perform multiple speculative wordline selections by implementing multiple sum and decode operations of a partial base operand and a partial offset operand. As used herein, a partial operand contains only a subset of the bits from a given operand. Moreover, a subset means a portion, part, or less than all of something and, in this case, a portion, part, or less than all of the bits of an operand. Consecutive means each bit follows immediately after each other bit in a sequence.

In addition, the wordline selections generated by the circuit 102 are "speculative" because each sum and decode of the partial operands is performed without a carry-in from the EA ADDER 110 to the LSB of the sum. In the embodiment illustrated, the circuit 102 is configured to perform up to two speculative accesses to the cache 112, 114 for each programming instruction and corresponding base and offset operand pair, a speculative even wordline access 126 and a speculative odd wordline access 122. However, in accordance with the present teachings, using a speculative WL access disable circuit 106, the speculative WL generation circuit 102 is configured to reduce the number of speculative wordline accesses, e.g., reduce the number of times that both an even and odd wordline are turned on contemporaneously, as explained in more detail later. The speculative WL access disable circuit 106 is also referred to herein as a memory array disable circuit.

The speculative even and odd wordline selections 126 and 122 are determined, respectively, by a speculative even wordline generator 104 and a speculative odd wordline generator 108. In an embodiment 126 includes one or a plurality of even WL signals, and 122 includes one or a plurality of odd WL signals. Any suitable circuitry, including known circuitry, can be used to implement blocks 104 and 108 in performing speculative wordline selections. One such known circuit that can be used to select even and odd array speculative wordlines and perform corresponding speculative wordline accesses is referred to herein as a Fast Address Decoding (FADEC) circuit. However, any suitable logic that is configured to generate multiple speculative memory accesses can be used. A detailed description of the known FADEC circuitry will not be provided here for the sake of brevity. However, a brief description of the FADEC circuitry is provided to enable a clearer understanding of the operation of the novel speculative WL access disable circuit 106, which is configured in accordance with the present teachings and described later in this document.

In an embodiment, the FADEC circuit used to implement blocks 104 and 108 takes a pair of partial operands, e.g., $OP_A$ 48 ... 51 and $OP_B$ 48 ... 51, and performs a fused addition and decode operation to map into $2^r$ signals based on r number of bits in the partial operands. More particularly, the FADEC circuit receives the pair of partial operands into a PGZO generation circuit whose function is distributed across or shared between the blocks 104 and 108. The PGZO generation circuit combines pairs of bits, e.g., bit pairs 48, 49, 50, and 51 in this instance, using logical operators (XOR, OR, AND, NAND) to create PGZO values. The example shown addresses a sixteen-entry memory array. Additional or fewer PGZO values can be used to compute PGZO values for more or less bits used to address larger or smaller memory arrays.

The result of the PGZO generations is a P value by XORing the inputs, a G value by ANDing the inputs, a Z value by ANDing the inverted inputs, and an O value by ORing the inputs. In addition, a P bar value and a G bar value are generated, with P bar being the inverse of the XOR value by XNORing the inputs and with G bar being the inverse of the AND value by NANDing the inputs. As used herein, PGZO refers to one or more values generated by XORing bits, XNORing bits, ANDing bits, NANDing bits, ORing bits, and ANDing inverted bit values. All operations may not be performed for every pair of bits.

The PGZO values are provided to a plurality of wordline generators, which include logic that determines whether the PGZO values maps to a particular decoded sum value. Each wordline generator is mapped to and represents one of the $2^r=n$ number of values, where r is the number of bits in the partial operands $OP_A$ 48 ... 51 and $OP_B$ 48 ... 51, and n is the total number of mapped values. In this illustration, there are n=16 total mapped values, e.g., 0-15. In this example embodiment, even wordline generators that map to even-numbered wordlines 0, 2, 4, 6, 8, 10, 12, and 14 are included together within the speculative even WL generator 104. Whereas, odd wordline generators that map to odd-numbered wordlines 1, 3, 5, 7, 9, 11, 13, and 15 are included together within the speculative odd WL generator 108.

By mapping the PGZO values to the various wordline generators, the wordline generators output whether a particular wordline is "possible" based upon the PGZO input. When the PGZO values are generated for four address bits of two operands and run through the sixteen wordline generators, as in this example, two possible or speculative wordlines signals result, a speculative even wordline signal 126 and a speculative odd wordline signal 122, assuming a carry-in of both 1 and 0 to the LSB 51 sum. Where the speculative even wordline signal 126 is provided to the even array 112 and the speculative odd wordline signal 122 is provided to the odd array 114, two possible wordlines are turned on and provide inputs 128 from the even array 112 and 124 from the odd array 114 to the selector circuit 116. The selector circuit also receives and uses an actual LSB bit 51 value (EA 51) and an LSB bit 51 bar value (EA 51 bar), for the LSB of the sum of the partial operands $OP_A$ 48 ... 51 and $OP_B$ 48 ... 51, to select one of the two inputs 128 or 124 as the matched output 132 from the cache.

In an embodiment, the selector circuit 116 includes a match selector and Dlatch circuitry. The match selector includes logic configured to AND the EA 51 value with the speculative odd wordline signal 124 and to AND the EA 51 bar value with the speculative even wordline signal 128 to select one of these signals to propagate as the matched output 132 from the cache. The Dlatch circuitry is configured to latch the selected wordline signal resulting in the matching memory array or cache entry 132.

The speculative WL access disable circuit 106 includes an adder circuit that is configured to sum other partial operands from the base and offset operand. The speculative WL access disable circuit 106 may further includes additional logic such as a plurality of coupled NAND and/or AND gates and inverters that can be arranged into a number of configurations to determine from the sum whether to allow access to just one of the plurality of memory arrays, in this case whether to allow access to just the even array 112 or the odd array 114, and disable access to the remaining array or arrays in the plurality of memory arrays. A more detailed description of the functionality of the speculative WL access disable circuit 106 is provided below by reference to FIG. 2.

Figure 2:
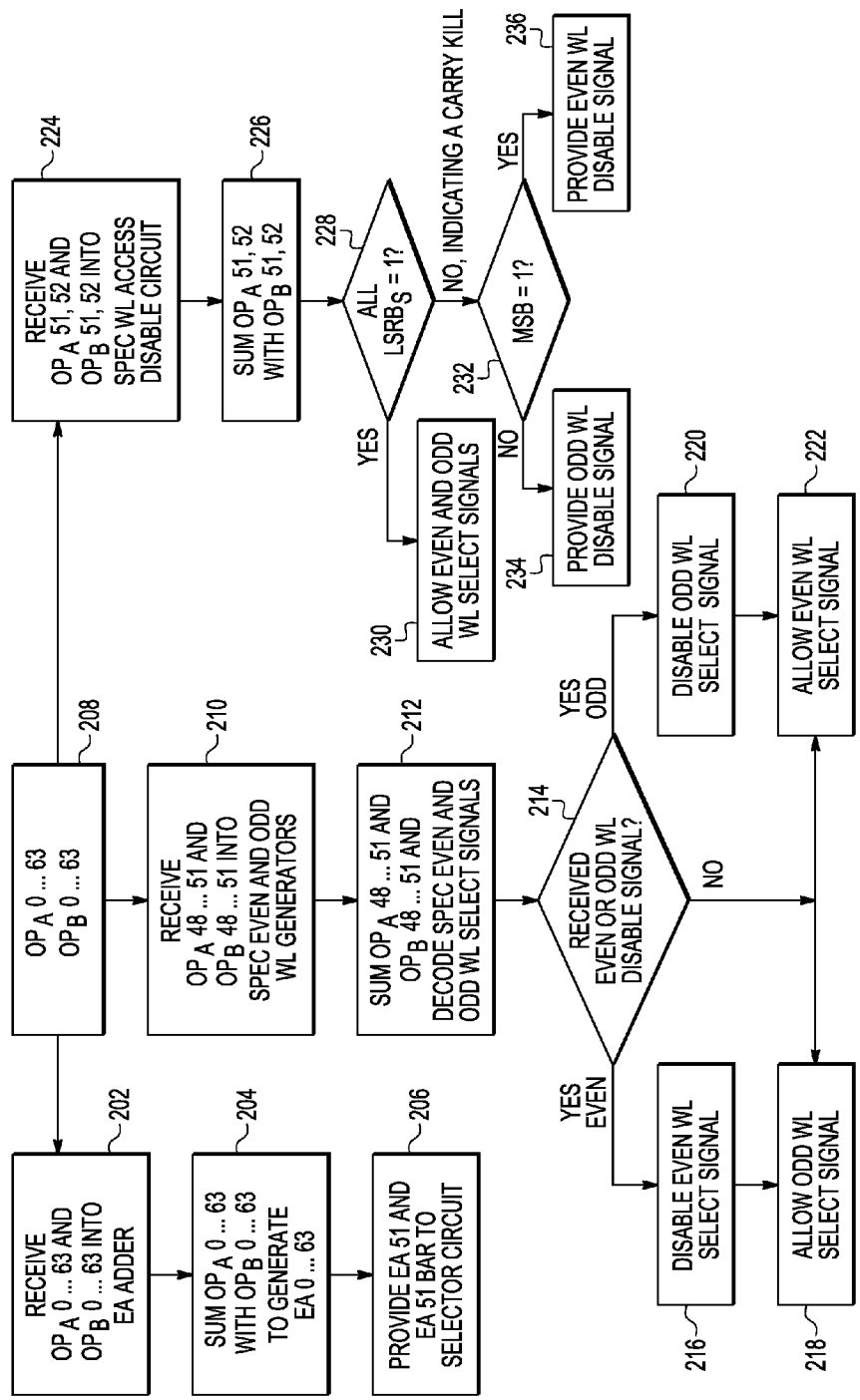
FIG. 2 is a flowchart illustrating a method for accessing a memory array in accordance with an embodiment.

Turning now to FIG. 2, which shows a flow diagram illustrating a method 200, performed in a computer system, for accessing a memory array using fewer speculative accesses, in accordance with an embodiment. In one example implementation, elements of system 100 shown in FIG. 1 are configured to perform method 200. As such, the flow diagram of FIG. 2 and inputs and outputs to the elements 104-116 shown in FIG. 1 are concurrently described below. In general, a number of parallel operations are performed by the elements of system 100, as illustrated by the method 200. Method 200 may be performed, for example, when a computer system executes an application or program characterized by a set of instructions or program code.

In this particular embodiment, memory addressing is computed by adding a base operand to an offset operand, for an instruction, to arrive at an effective address at least a portion of which can be used to access content within a memory array, such as a cache within the CPU, a memory unit external to the CPU, a translation look-aside buffer (TLB), etc. Namely, three parallel operations are performed by: the EA ADDER 110 using functions 202-206; the speculative even WL generator 104 and the speculative odd WL generator 108 using functions 210-222; and the speculative WL access disable circuit 106 using functions 224-236.

More particularly with respect to the method 200, at 208, while the CPU is executing code, a base operand $OP_A$ and an offset operand $OP_B$ is presented for a thread of execution. In an embodiment, each operand includes 64 bits or binary digits, e.g., bits 0 to 63, wherein bit 63 is a LSB for the operand and bit 0 is a most significant bit MSB for the operand. The LSB, in this example, is the rightmost bit of a sequence of bits such as an operand or a portion of an operand; and the leftmost bit of the bit sequence is correspondingly the MSB. Moreover, each bit within the operand has a bit value of, equivalent to, or corresponding to a binary zero (0) or a binary one (1). In an alternative embodiment, the operands have more or fewer bits. In other embodiments, the significance of the bits might be reversed so that the higher-numbered bit is more significant than the lower-numbered bit.

The EA ADDER 110 is configured to receive the base operand $OP_A$ and the offset operand $OP_B$, at 202. The EA ADDER 110 is further configured to operate concurrently in time with the speculative WL generation circuit 102 to sum, at 204, the base operand with the offset operand to determine an effective memory address EA 0 ... 63. The EA ADDER 110 is further configured to provide at 206 the "actual" LSB sum of bits 51 referred to as EA 51 and the complement of EA 51 referred to as EA 51 bar. EA 51 is the actual LSB sum of the bits 51 from the base and offset operands because the sum has received a carry-in from the addition of the bits 52 to 63 of the base and offset operands.

As mentioned above, the EA ADDER 110 performs its operations in parallel or concurrently in time with operations performed by the speculative WL generation circuit 102, the description of which follows. At 224, the speculative WL access disable circuit 106 receives a first plurality of consecutive bits $OP_A$ 51, 52 from the base operand and receives a first plurality of consecutive bits $OP_B$ 51, 52 from the offset operand. Concurrently, or substantially concurrently, at 210 the speculative even and odd WL generators 104 and 108, respectively, receive a second plurality of consecutive bits $OP_A$ 48 ... 51 from the base operand and receives a second plurality of consecutive bits $OP_B$ 48 ... 51 from the offset operand. In an embodiment, the second plurality of consecutive bits $OP_A$ 48 ... 51 from the base operand includes a first set of index bits, and the second plurality of consecutive bits $OP_B$ 48 . . . 51 from the offset operand includes a second set of index bits. The first and second sets of index bits are used to select two potential wordlines, an even and odd wordline, and then a final wordline match of the cache depending on the output from the speculative WL access disable circuit 106 and/or the values of EA 51 and EA 51 bar.

As can be seen, a most significant bit 51 of the first plurality of consecutive of bits $OP_A$ 51, 52 from the base operand is a least significant bit of the second plurality of consecutive bits $OP_A$ 48 . . . 51 from the base operand; and a most significant bit 51 of the first plurality of consecutive bits $OP_B$ 51, 52 from the offset operand is a least significant bit of the second plurality of consecutive bits $OP_B$ 48 . . . 51 from the offset operand. This relationship between the partial operands received into circuit 106 and the partial operands received into circuits 104 and 108, provides the basis for the speculative WL access disable circuit 106 to determine when multiple speculative accesses are needed and to determine, with certainty, when access to either the even array 112 or the odd array 114 can be disabled, as described further below.

As mentioned above, summing the first plurality of consecutive bits $OP_A$ 51, 52 from the base operand with the first plurality of consecutive bits $OP_B$ 51, 52 from the offset operand to generate the sum value is performed in parallel with summing the second plurality of consecutive bits OPA 48 . . . 51 from the base operand with the second plurality of consecutive bits $OP_B$ 48 . . . 51 from the offset operand to generate at least one memory array index address, e.g., signal 122 and/or 126, used to select a wordline from the one or more of the plurality of memory arrays to which access is allowed. In an embodiment, at 212, the blocks 104 and 108 perform the fused sum and decode operation on the partial operands $OP_A$ 48 . . . 51 and $OP_B$ 48 . . . 51 to determine speculative even and odd wordlines. In this example implementation circuitry, two speculative wordlines are determined using the FADEC approach, as briefly described above. However, the number of speculative wordlines is determined based on the configuration of the speculative WL generation circuit 102.

At 214, it is determined whether an even WL disable signal 118 has been received into the speculative even WL generator 104 or an odd WL disable signal 120 has been received into the speculative odd WL generator 108. When the even WL disable signal 118 is received, the circuit 104 disables the speculative even WL signals 126, at 216 and, thereby, disables a speculative access to the even array 112. Only the speculative odd WL 122 is allowed, at 218, to be turned on in the odd array 114, thereby, allowing access to only the odd array 114. The contents 124 of the odd-numbered wordline are propagated to the output 132 of the selector circuit 116. For instance, upon receiving the even WL disable signal 118 representing a logic "1" value, both the speculative even WL signal and the even WL disable signal 118 are input into a AND operation, for instance including a NAND gate followed by an inverter, to kill the speculative even WL signals 126 and prevent or disable access to the even array 112. In another embodiment, the even WL disable signal 118 represents a logic "0" value that is input into an AND operation with the speculative even WL signal to kill the speculative even WL signals 126 and prevent or disable access to the even array 112.

In a further embodiment, the even WL disable signal 118 is combined in a logic gate with a clock signal, which controls the operation of the speculative even WL generator 104, to prevent this logic circuit from even determining the speculative even wordline. In such a case, it can be said that disabling access to the even array 112 includes disabling one or more logic circuits in the speculative even WL generator 104, such as disabling the PGZO generator when separate PGZO generators are used in blocks 104 and 106 and/or disabling one or more even WL generators in the block 104.

Similarly, when the odd WL disable signal 120 is received, the circuit 108 disables the speculative odd WL signals 122, at 220 and, thereby, disables a speculative access to the odd array 114. Only the speculative even WL 126 is allowed, at 222, to be turned on in the even array 112, thereby, allowing access to only the even array 112. In this case, the contents 128 of the even-numbered wordline are propagated to the output 132 of the selector circuit 116. Where no wordline disable signal is received, speculative access to both the even 112 and odd 114 arrays is allowed, at 218 and 222; and the true wordline is determined using EA 51 and EA 51 bar.

Turning back to the operation of the speculative WL access disable circuit 106, at 226, circuit 106 sums the first plurality of consecutive bits $OP_A$ 51, 52 from the base operand with the first plurality of consecutive bits $OP_B$ 51, 52 from the offset operand to generate a sum value. Circuit 106 then detects, at 228, a value of each lesser significant bit (LSRB) to the MSB and determines whether all of the LSRBs have a value that represents or is equivalent to a logic "1" value. If so, circuit 106 allows, at 230, both even and odd speculative WL accesses, for instance, in a manner as described above. The detection can be performed by a combination of logic gates. Thus, in general, access is allowed to two of a plurality of memory arrays when each lesser significant bit to the most significant bit of the sum value equals to one. Moreover, where the plurality of memory arrays includes an even wordline array and an odd wordline array, as in this example embodiment, both arrays are accessed when each lesser significant bit to the most significant bit of the sum value equals to one.

Alternatively, if at 228 it is determined that any LSRB to the MSB of the sum of $OP_A$ 51, 52 and $OP_B$ 51, 52 is equal to zero, this "0" effectively "kills" or stops a propagation of a "1" from any LSRB in the effective address. This, thereby, prevents a carry-in to the MSB of the sum value generated from adding $OP_A$ 51, 52 with $OP_B$ 51, 52. Since the MSB of the sum value generated from adding $OP_A$ 51, 52 with $OP_B$ 51, 52 is also the LSB of the sum value generated from adding $OP_A$ 48 . . . 51 with $OP_B$ 48 . . . 51, it can be determined with certainty that there will correspondingly be no carry-in to the LSB of the sum value generated from adding $OP_A$ 48 . . . 51 with $OP_B$ 48 . . . 51. Therefore, it can be determined with certainty which array, in this case the even 112 or the odd 114 array, should be accessed without the need to speculatively access both arrays. Thus, the speculative WL access disable circuit 106 can in some instances enable the determination of a true sum of $OP_A$ 48 . . . 51 with $OP_B$ 48 . . . 51 without receiving the EA 51 and EA 51 bar from the EA ADDER 110.

When, at 228, it is determined that any LSRB to the MSB of the sum of $OP_A$ 51, 52 and $OP_B$ 51, 52 is equal to zero, the MSB of the sum of $OP_A$ 51, 52 and $OP_B$ 51, 52 is then used to determine, at 232, which array of the plurality of arrays to allow access and which array(s) to disable access. In this embodiment, where the MSB represents a logic "1" value, the speculative WL access disable circuit 106 provides, at 236, the even WL disable signal 118 to the speculative even WL generator 104. On the other hand, where the MSB represents a logic "0" value, the speculative WL access disable circuit 106 provides, at 234, the odd WL disable signal 120 to the speculative odd WL generator 108.

In the above example, two-bit partial operands, e.g., using bits 51 and 52, were input to circuit 106 to determine whether both speculative accesses should be performed or just one access to either the even array 112 or the odd array 114. Equation (1) represents the summation of bits 51:52 from $OP_A$ with bits 51:52 from $OP_B$:

$$OP_A(51:52) + OP_B(51:52) = Sum(51:52) \quad (1)$$

Table 1 below shows all possible sum outcomes from Equation (1):

TABLE 1

| Sum(51:52) | |
|---|---|
| 0 | 0 |
| 0 | 1 |
| 1 | 0 |
| 1 | 1 |

In the above example implementation, the sum value generated at 226 from equation (1) is used to determine whether both speculative accesses should be performed or just one access to either the even array 112 or the odd array 114. In this two-bit example, it can be seen that if any of the lesser significant bits, e.g., bit 52, to the MSB, e.g., bit 51, of the sum value equals to zero (0), even if there is a 1 as a carry-in from the bit 53 of the effective address, the carry-in will be killed, or prevented from propagating, by the zero at the bit 52 of the sum. Thus, where there is a zero in the bit 52 position, only one wordline access need be made to either the even array 112 or the odd array 114. Because one or more zeros (0s) in the lesser significant bits of the sum value indicate carry-kills, speculative accesses to all memory arrays can be reduced by accessing one of the memory arrays instead of all of plurality of memory arrays. As used herein, a "carry-kill" means that any carries generated by adding lesser significant bits to the MSB of the sum, generated by equation (1), will not affect the sum performed in function 212 of the index bits.

Accordingly, when the sum value of bit 52 equals to zero (0), this acts as a carry-kill since if there is a carry-in to the sum value of bit 52, the carry cannot propagate to and change the sum value of bit 51. Therefore, access to one of the memory arrays 112 or 114 is allowed with certainty while leaving the other memory arrays disabled. In the case where the sum value 52 equals to one (1), a carry-in to the sum value bit 52 can propagate to the sum value bit 51 thereby changing its value. Since the actual value of the carry-in to the sum value bit 51 is unknown, access is allowed to all the memory arrays.

Where bit 52 of the sum is zero, bit 51 is used to determine which memory array to disable. For instance, where bit 51 is 1, the odd array 114 is accessed, and access to the even array 112 is disabled. Where bit 51 is 0, the even array 112 is accessed, and access to the odd array 114 is disabled. Referring again to Table 1, zero occurs 2 out of 4 times, or 50% of the time, in the sum value of bit 52. This means that only one of the memory arrays out of the plurality of memory arrays would be accessed 50% of the time, and both memory arrays of the plurality of memory arrays would be accessed the other 50% of the time. This amounts to a 50% reduction in speculative accesses, thereby reducing power consumption. Thus, in general, in accordance with the method 200 illustrated in FIG. 2, allowing access to one of the plurality of memory arrays includes: allowing access to a first memory array of the plurality of memory arrays when the most significant bit of the sum value equals to one; and allowing access to a second memory array of the plurality of memory arrays when the most significant bit of the sum value equals to zero. Where there is one even and one odd memory array, allowing access to the first memory array includes allowing access to an odd wordline memory bank, and allowing access to the second memory array includes allowing access to an even wordline memory bank. In other words, allowing access to one of the plurality of memory arrays and disabling access to the remainder of the plurality of memory arrays includes either: allowing access to a first memory array including only odd numbered wordlines and disabling access to a second memory array including only even numbered wordlines; or allowing access to the second memory array including only the even numbered wordlines and disabling access to the first memory array including only the odd numbered wordlines.

In another embodiment, the partial operands received into the speculative WL access disable circuit 106 each include three consecutive bits, e.g., 51 ... 53. Equation (2) represents the summation of bits 51:52:53 from $OP_A$ with bits 51:52:53 from $OP_B$:

$$OP_A(51:52:53) + OP_B(51:52:53) = Sum(51:52:53) \quad (2)$$

Table 2 shows all possible sum outcomes from Equation (2):

TABLE 2

| Sum(51:52:53) | | |
|---|---|---|
| 0 | 0 | 0 |
| 0 | 0 | 1 |
| 0 | 1 | 0 |
| 0 | 1 | 1 |
| 1 | 0 | 0 |
| 1 | 0 | 1 |
| 1 | 1 | 0 |
| 1 | 1 | 1 |

In this three-bit example, it can be seen that if any of the lesser significant bits, e.g., bit 52 or 53, to the MSB, e.g., bit 51, of the sum value equals to zero (0), even if there is a 1 as a carry-in from the bit 54 of the effective address, the carry-in will be killed, or prevented from propagating, by the zero at the bit 52 or 53 of the sum. Thus, where there is a zero in the bit 52 or 53 position, only one wordline access need be made to either the even array 112 or the odd array 114. Referring again to Table 2, zero occurs 6 out of 8 times, or 75% of the time, in the sum value of bits 52 and/or 53. This means that only one of the memory arrays out of the plurality of memory arrays would be accessed 75% of the time, and both memory arrays of the plurality of memory arrays would be accessed the other 25% of the time. This amounts to a 75% reduction in speculative accesses, thereby further reducing power consumption.

It is to be understood that summing additional lesser significant bits from $OP_A$ and $OP_B$ in circuit 106 results in a further reduction in speculative accesses. However, to balance the reduction in speculative accesses with the decoding time, in an embodiment, the first plurality of consecutive bits, e.g., $OP_A$ 51, 52, from the base operand contains a number of bits that is no more than a number of bits contained in the second plurality of consecutive bits, $OP_A$ 48 ... 51, from the base operand. In addition, the first plurality of consecutive bits, e.g., $OP_B$ 51, 52, from the offset operand contains a number of bits that is no more than a number of bits, e.g., $OP_B$ 48 ... 51, contained in the second plurality of consecutive bits from the offset operand.

For example, where the second plurality of consecutive bits from the base and offset operands contain four bits, the first plurality of consecutive bits from the base and offset operands contain four or fewer bits. In another example, where the second plurality of consecutive bits from the base and offset operands contain three bits, the first plurality of consecutive bits from the base and offset operands contain three or fewer bits. Other arrangements having a number of bits of the partial operands received into block 104 and 106 that is different than the number of bits of the partial operands received into block 106 can be envisioned within the scope of the present teachings. In one example, the partial operands provided to blocks 104 and 108 have fewer bits than the partial operands provided to block 106.

As described in detail above, in accordance with an embodiment of the present teachings is memory access apparatus including a plurality of memory arrays coupled to a memory array disable circuit. The memory array disable circuit is configured to: receive a first plurality of consecutive bits from a base operand, wherein a most significant bit of the first plurality of consecutive of bits from the base operand is a least significant bit of a second plurality of consecutive bits from the base operand; and receive a first plurality of consecutive bits from an offset operand, wherein a most significant bit of the first plurality of consecutive bits from the offset operand is a least significant bit of a second plurality of consecutive bits from the offset operand. The memory array disable circuit is further configured to sum the first plurality of consecutive bits from the base operand with the first plurality of consecutive bits from the offset operand to generate a sum value; and allow access to one of a plurality of memory arrays and disable access to the remainder of the plurality of memory arrays when a lesser significant bit to a most significant bit of the sum value equals to zero.

In an embodiment, the plurality of memory arrays includes a first memory array and a second memory array, wherein the memory array disable circuit is configured to either: allow access to the first memory array when the most significant bit of the sum value equals to one or allow access to the second memory array when the most significant bit of the sum value equals to zero. In a further embodiment, the first memory array is an odd wordline memory bank or odd array having only odd wordlines, and the second memory array is an even wordline memory bank or even array having only even wordlines.

In yet a further embodiment, the memory array apparatus further includes: a speculative even wordline generator coupled between the memory array disable circuit and the even array and configured to generate at least one even wordline signal for accessing an even wordline from the even array; and a speculative odd wordline generator coupled between the memory array disable circuit and the odd array and configured to generate at least one odd wordline signal for accessing an odd wordline from the odd array. The memory array disable circuit is, accordingly, configured, when the lesser significant bit to a most significant bit of the sum value equals to zero, to either: allow access to the even array and disable the at least one odd wordline signal to disable access to the odd array; or allow access to the odd array and disable the at least one even wordline signal to disable access to the even array.

In the foregoing specification, specific embodiments have been described. However, one of ordinary skill in the art appreciates that various modifications and changes can be made without departing from the scope of the disclosure as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendment made during the pendency of this application and all equivalents of those claims as issued.

For the sake of brevity, conventional techniques related to semiconductor fabrication including those using conventional CMOS technology, CMOS devices, MOSFETs adder circuits, operand decoding circuits, memory arrays such as caches, and other functional aspects of a system or IC, and the individual system or IC operating components, may not be described in detail. Furthermore, the connecting lines shown in the various figures contained herein are intended to represent example functional relationships and/or physical couplings between the various elements. It should be noted that many alternative or additional functional relationships or physical connections may be present in a practical embodiment. Moreover, the various IC embodiments described above may be produced or fabricated using conventional semiconductor processing techniques, e.g., well known CMOS techniques. Further, a variety of well-known and common semiconductor materials may be used, e.g., traditional metals such as aluminum, copper, gold, etc., polysilicon, silicon dioxide, silicon nitride, silicon, and the like.

In this document, the terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%.

As used herein, the term "configured to", "configured with", "arranged to", "arranged with", "capable of" and any like or similar terms means that referenced circuit elements have an internal physical arrangement such as by virtue of a particular transistor technology used and/or physical coupling and/or connectivity with other circuit elements in an inactive state. This physical arrangement and/or physical coupling and/or connectivity while in the inactive state enables the circuit elements to perform stated functionality while in the active state of receiving and processing various signals at inputs of the circuit elements to generate signals at the output of the circuit elements. A device or structure that is "configured" in a certain way is configured in at least that way, but may also be configured in ways that are not described.

As further used herein, a "node" means any internal or external reference point, connection point, junction, signal line, conductive element, or the like, at which a given signal, logic level, voltage, data pattern, current, or quantity is present. Furthermore, two or more nodes may be realized by one physical element, and two or more signals can be multiplexed, modulated, or otherwise distinguished even though received or output at a common node.

The above description refers to nodes or features being "connected" or "coupled" together. As used here and, unless expressly stated otherwise, "coupled" means that one node or feature is directly or indirectly joined to or is in direct or indirect communication with another node or feature, and not necessarily physically. As used herein, unless expressly stated otherwise, "connected" means that one node or feature is directly joined to or is in direct communication with another node or feature. For example, a switch may be "coupled" to a plurality of nodes, but all of those nodes need not always be "connected" to each other; moreover, the switch may connect different nodes to each other depending on the state of the switch. Furthermore, although the various circuit schematics shown herein depict certain example arrangement of elements, additional intervening elements, devices, features, or components may be present in an actual embodiment, assuming that the functionality of the given circuit is not adversely affected.

In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method for accessing a memory array, the method comprising:
    receiving a first subset of consecutive bits from a base operand, wherein a most significant bit of the first subset of consecutive bits from the base operand is a least significant bit of a second subset of consecutive bits from the base operand;
    receiving a first subset of consecutive bits from an offset operand, wherein a most significant bit of the first subset of consecutive bits from the offset operand is a least significant bit of a second subset of consecutive bits from the offset operand,
    wherein the first and second subsets of consecutive bits from the base and offset operands are provided to a speculative wordline generation circuit configured to generate a plurality of speculative wordlines each for controlling speculative access of a different memory array of a plurality of memory arrays, and wherein the first subset of consecutive bits from the base operand consists of a number of bits that is no more than a number of bits in the second subset of consecutive bits from the base operand, and the first subset of consecutive bits from the offset operand consists of a number of bits that is no more than a number of bits in the second subset of consecutive bits from the offset operand;
    summing the first subset of consecutive bits from the base operand with the first subset of consecutive bits from the offset operand to generate a sum value at the speculative wordline generation circuit; and
    allowing speculative access to only one of the plurality of memory arrays and disabling speculative access to the remainder of the plurality of memory arrays when the sum value indicates a carry-kill, wherein the carry-kill is indicated by any lesser significant bit to the most significant bit of the sum value equaling to zero, wherein allowing speculative access to only one of the plurality of memory arrays comprises allowing speculative access to a first memory array of the plurality of memory arrays when the most significant bit of the sum value equals to a first value, and allowing speculative access to a second memory array of the plurality of memory arrays when the most significant bit of the sum value equals to a second value.

2. The method of claim 1, wherein the plurality of memory arrays comprises a cache within a central processing unit, wherein the second subset of consecutive bits from the base operand comprises a first set of index bits, and the second subset of consecutive bits from the offset operand comprises a second set of index bits, wherein the first and second sets of index bits are used to select a wordline of the cache.

3. The method of claim 1, wherein the first value equals to one, and the second
    value equals to zero.

4. The method of claim 1, wherein allowing speculative access to the first memory array comprises allowing speculative access to an odd wordline memory bank, and allowing speculative access to the second memory array comprises allowing speculative access to an even wordline memory bank.

5. The method of claim 1, wherein allowing speculative access to only one of the plurality of memory arrays and disabling speculative access to the remainder of the plurality of memory arrays comprises either: allowing speculative access to the first memory array comprising only odd numbered wordlines and disabling speculative access to the second memory array comprising only even numbered wordlines; or allowing speculative access to the second memory array comprising only the even numbered wordlines and disabling speculative access to the first memory array comprising only the odd numbered wordlines.

6. The method of claim 1 further comprising allowing speculative access to two of the plurality of memory arrays when each lesser significant bit to the most significant bit of the sum value equals to one.

7. The method of claim 6, wherein the plurality of memory arrays comprises an even wordline array and an odd wordline array that are both speculatively accessed when each lesser significant bit to the most significant bit of the sum value equals to one.

8. The method of claim 1, wherein the second subset of consecutive bits from the base and offset operands contain four bits, and the first subset of consecutive bits from the base and offset operands both contain a same number of bits, which is no more than four bits.

9. The method of claim 1, wherein the second subset of consecutive bits from the base and offset operands contain three bits, and the first subset of consecutive bits from the base and offset operands both contain the same amount of bits, which is no more than three bits.

10. The method of claim 1, wherein summing the first subset of consecutive bits from the base operand with the first subset of consecutive bits from the offset operand to generate the sum value is performed in parallel with summing the second subset of consecutive bits from the base operand with the second subset of consecutive bits from the offset operand to generate at least one memory array index address used to select a wordline from the one of the plurality of memory arrays to which speculative access is allowed.

11. Memory access apparatus comprising:
    a plurality of memory arrays comprising a first memory array and a second memory array;
    a memory array disable circuit, of a speculative wordline generation circuit, which is coupled to the plurality of memory arrays and configured to:
    receive a first subset of consecutive bits from a base operand, wherein a most significant bit of the first subset of consecutive bits from the base operand is a least significant bit of a second subset of consecutive bits from the base operand;
    receive a first subset of consecutive bits from an offset operand, wherein a most significant bit of the first subset of consecutive bits from the offset operand is a least significant bit of a second subset of consecutive bits from the offset operand, wherein the first and second subsets of consecutive bits from the base and offset operands are provided to the speculative wordline generation circuit configured to generate a plurality of speculative wordlines each for controlling speculative access of a different memory array of a plurality of memory arrays, and wherein the first subset of consecutive bits from the base operand consists of a number of bits that is no more than a number of bits in the second subset of consecutive bits from the base operand, and the first subset of consecutive bits from the offset operand consists of a number of bits that is no more than a number of bits in the second subset of consecutive bits from the offset operand;

sum the first subset of consecutive bits from the base operand with the first subset of consecutive bits from the offset operand to generate a sum value at the speculative wordline generation circuit; and allow speculative access to only one of the plurality of memory arrays and disable speculative access to the remainder of the plurality of memory arrays when the sum value indicates a carry-kill, wherein the carry-kill is indicated by any lesser significant bit to the most significant bit of the sum value equaling to zero, wherein allowing speculative access to only one of the plurality of memory arrays comprises allowing speculative access to a first memory array of the plurality of memory arrays when the most significant bit of the sum value equals to a first value, and allowing speculative access to a second memory array of the plurality of memory arrays when the most significant bit of the sum value equals to a second value.

12. The memory array apparatus of claim 11, wherein the memory array disable circuit is configured to either: allow speculative access to the first memory array when the most significant bit of the sum value equals to one or allow speculative access to the second memory array when the most significant bit of the sum value equals to zero.

13. The memory array apparatus of claim 12, wherein the first memory array is an odd wordline memory bank, and the second memory array is an even wordline memory bank.

14. The memory array apparatus of claim 11, wherein the first memory array comprises an even array having only even wordlines and the second memory array comprises an odd array having only odd wordlines, the memory array apparatus further comprising:

a speculative even wordline generator coupled between the memory array disable circuit and the even array and configured to generate at least one even wordline signal for speculatively accessing an even wordline from the even array; and a speculative odd wordline generator coupled between the memory array disable circuit and the odd array and configured to generate at least one odd wordline signal for speculatively accessing an odd wordline from the odd array;

wherein the memory array disable circuit is configured, when the lesser significant bit to the most significant bit of the sum value equals to zero, to either: allow speculative access to the even array and disable the at least one odd wordline signal to disable speculative access to the odd array; or allow speculative access to the odd array and disable the at least one even wordline signal to disable speculative access to the even array.

15. The memory array apparatus of claim 14, wherein the memory array disable circuit is configured to allow speculative access to both the even and the odd array when each lesser significant bit to the most significant bit of the sum value equals to one.

16. A method for accessing a memory array, the method comprising:

summing a first set of bits with a second set of bits to generate a sum value at a speculative wordline generation circuit, wherein the first set of bits comprises at least two consecutive bits from a base operand, wherein a most significant bit of the first set of bits is a least significant bit of a base index address from the base operand, wherein the second set of bits comprises at least two consecutive bits from an offset operand, wherein a most significant bit of the second set of bits is a least significant bit of an offset index address from the offset operand, wherein the first and second sets of bits from the base and offset operands are provided to the speculative wordline generation circuit which is configured to generate a plurality of speculative wordlines each for controlling speculative access of a different memory array of a plurality of memory arrays, and wherein the first set of bits from the base operand consists of a number of bits that is no more than a number of bits in the second set of bits from the base operand, and the first set of bits from the offset operand consists of a number of bits that is no more than a number of bits in the second set of bits from the offset operand; and disabling speculative access to one and allowing speculative access to one of two memory arrays, comprising an odd wordline memory array and an even wordline memory array, when the sum value indicates a carry-kill, wherein the carry-kill is indicated by any lesser significant bit to the most significant bit of the sum value equals to zero, wherein disabling access to one and allowing speculative access to one of the two memory arrays comprises disabling speculative access to the odd wordline memory array and allowing speculative access to the even wordline memory array when the most significant bit of the sum value equals to a first value, and disabling speculative access to the even wordline memory array and allowing speculative access to the odd wordline memory array when the most significant bit of the sum value equals to a second value.

17. The method of claim 16, wherein disabling speculative access to one and allowing speculative access to one of the two memory arrays comprises:

disabling speculative access to the odd wordline memory array and allowing speculative access to the even wordline memory array when the most significant bit of the sum value equals to zero;

disabling speculative access to the even wordline memory array and allowing speculative access to the odd wordline memory array when the most significant bit of the sum value equals to one.

18. The method of claim 16 further comprising allowing speculative access to both the odd and the even wordline memory arrays when each lesser significant bit to the most significant bit of the sum value equals to one.

19. The method of claim 16, wherein the base index address and the offset index address both contain a same number of bits, which is equal to three bits or four bits, and the first and second sets of bits from the base and offset operands both contain a same number of bits, which is no more than four bits.

* * * * *